(12) United States Patent
Yang et al.

(10) Patent No.: US 6,722,460 B2
(45) Date of Patent: Apr. 20, 2004

(54) ELECTRIC SCOOTER WITH FUEL CELL ENGINE ASSEMBLY

(75) Inventors: Jefferson Y S Yang, Orange, CA (US); Te-Chou Yang, Kaohsiung (TW); Yao-Sheng Hsu, Taipei (TW)

(73) Assignee: Asia Pacific Fuel Cell Technologies, Ltd., Taipei (TW)

( * ) Notice: Subject to any disclaimer, the term of this patent is extended or adjusted under 35 U.S.C. 154(b) by 47 days.

(21) Appl. No.: 10/243,758

(22) Filed: Sep. 16, 2002

(65) Prior Publication Data

US 2004/0050606 A1 Mar. 18, 2004

(51) Int. Cl.[7] .............................................. B62D 61/02
(52) U.S. Cl. ...................................... 180/220; 180/65.3
(58) Field of Search ................................ 180/220, 65.3, 180/65.1, 219, 229, 65.8

(56) References Cited

U.S. PATENT DOCUMENTS

| 6,158,543 | A | | 12/2000 | Matsuto | |
|---|---|---|---|---|---|
| 6,326,765 | B1 | * | 12/2001 | Hughes et al. | 320/104 |
| 6,568,496 | B1 | * | 5/2003 | Huang | 180/220 |
| 2002/0005305 | A1 | * | 1/2002 | Hirayama et al. | 180/68.5 |
| 2002/0066606 | A1 | | 6/2002 | Nakamori | |
| 2002/0162693 | A1 | * | 11/2002 | Mizuno et al. | 180/65.1 |

FOREIGN PATENT DOCUMENTS

| EP | 0728613 A2 | 8/1996 |
|---|---|---|
| EP | 1132251 A | 9/2001 |
| EP | 1215111 A | 6/2002 |

* cited by examiner

*Primary Examiner*—Daniel G. DePumpo
*Assistant Examiner*—Tony Winner
(74) *Attorney, Agent, or Firm*—Rosenberg, Klein & Lee (57) ABSTRACT

An electric scooter includes a scooter frame having a rear cover inside which a fuel cell stack is mounted in an inclined manner and a center cover connected to the rear cover by a footstep section. A front cover is mounted to a front side of the scooter frame and forms an interior space with the center cover. A hydrogen canister holder is mounted in the interior space for retaining a number of hydrogen storage canisters in an inclined manner for supply of hydrogen to the fuel cell stack. The canisters are arranged in pair on opposite sides of a centerline of the scooter frame. A heat dissipation system including a coolant container, a heat exchanger, and a pump is further provided in the interior space to maintain the hydrogen storage canisters at a proper operation temperature.

9 Claims, 10 Drawing Sheets

ELECTRIC SCOOTER WITH FUEL CELL ENGINE ASSEMBLY

BACKGROUND OF THE INVENTION

1. Field of the Invention

The present invention relates generally to an electric scooter, and in particular to an electric scooter with a fuel cell engine assembly.

2. The Related Art

Vehicles powered by fossil fuels are the most commonly used transportation means. However, the fossil fuel engine has severe disadvantages, such as air pollution and noise. In addition, the fossil fuel engine has a low efficiency in converting the fuel into useful power to the vehicle. Thus, a lot of projects are devoted to develop electrically driven vehicles for replacement of the fossil fuel driven vehicles. One of the most well-known electrically driven vehicles is "electric scooters".

Conventionally, the electric scooters are powered by storage batteries, such as lead-acid battery. The development of such conventional electricity storage has continued for more than ten years, yet the performance of the conventional storage battery as a power source for electric scooter is not satisfactory to the general consumers. Thus, fuel cell batteries using hydrogen as fuel are thus developed as a more effective substitute for the conventional storage batteries.

Fuel cells are a power source that generates electricity by electro-chemical reaction between the hydrogen fuel and oxygen. Since the electricity is generated by "burning" hydrogen, the fuel cells give no pollution and have an excellent efficiency for energy conversion. In addition, the fuel cells have a long-lasting service life and high energy density as compared to the conventional storage batteries. Thus, the fuel cells are suitable for powering the electric scooters. A number of fuel cell system are available in the markets, among which the so-called PEMFC (proton exchange membrane fuel cell) is the most industrially valuable due to its low operation temperature, quick start up and high energy density.

Besides severe requirement for the performance of the power source, the design of electric scooters also requires to make full use of the space inside the electric scooter in order to get the best overall performance of the electric scooter. The conventional designs of electric scooters simply position hydrogen storage canisters and/or other components below a footstep portion, not pay serious attention to weight balance problem caused by the power storage related components. As a consequence, the overall performance of the electric scooter is adversely affected due to safety concern caused by the unbalanced weight.

Thus, it is desired to have a more efficient arrangement of the fuel cell related components on an electric scooter for eliminating or at least alleviating the aforementioned problems.

SUMMARY OF THE INVENTION

Thus, a primary object of the present invention is to provide an electric scooter equipped with a fuel cell engine assembly for powering the electrical motor of the electric scooter. The fuel cell engine assembly mainly includes a fuel cell stack and a number of hydrogen storage canisters. In addition, a blower and a humidifier mounted inside a scooter frame of the scooter in order to enhance the performance of the electric scooter.

Another object of the present invention is to provide an electric scooter powered by a fuel cell based power assembly of which related components are arranged inside a scooter frame of scooter in a weight-balanced manner so as to enhance driving safety and moving smoothness of the scooter.

A further object of the present invention is to provide an electric scooter powered by a fuel cell engine assembly comprising metal hydride hydrogen storage canisters for safe and efficient storage of hydrogen, the canisters being readily mounted to and dismounted from a scooter frame of the electric scooter.

To achieve the above objects, in accordance with the present invention, there is provided an electric scooter comprising a scooter frame having a rear cover inside which a fuel cell stack is mounted in an inclined manner and a center cover connected to the rear cover by a footstep section. A blower is arranged inside the footstep section for causing an air flow through the fuel cell stack. A humidifier is also arranged inside the footstep section for maintaining a proper humidity level for the fuel cell stack. A front cover is mounted to a front side of the scooter frame and forms an interior space with the center cover. A hydrogen canister holder is mounted in the interior space and located substantially above the front wheel of the scooter. The hydrogen canister holder retains a number of hydrogen storage canisters in an inclined manner for supply of hydrogen to the fuel cell stack. The canisters are arranged in pair on opposite sides of a centerline of the scooter frame whereby balance of weight can be achieved. A heat dissipation system comprising a coolant container containing a coolant and a heat exchanger through which the coolant flows is arranged inside the front cover. A pump drives the coolant through the fuel cell stack for cooling purposes. The coolant that is heated by the fuel cell stack is driven through the hydrogen canister holder to maintain the hydrogen storage canisters at a proper operation temperature.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF PREFERRED EMBODIMENTS

With reference to the drawings and in particular to FIGS. 1 to 4, an electric scooter constructed in accordance with a first embodiment of the present invention, generally designated with reference numeral 1, comprises a scooter frame 11 inside which a fuel cell engine assembly is mounted. The scooter frame 11 comprises a rear cover 11a on which a seat 12 is mounted and a center cover 11d connected to the rear cover 11a by a footstep section 11b. A front cover 11c is mounted to a front side of the scooter frame 11 with an interior space (not labeled) defined between the front cover 11c and the center cover 11d. Front and rear wheels 15a, 15b are respectively mounted to the front and rear sides of the scooter frame 11.

Figure 1:
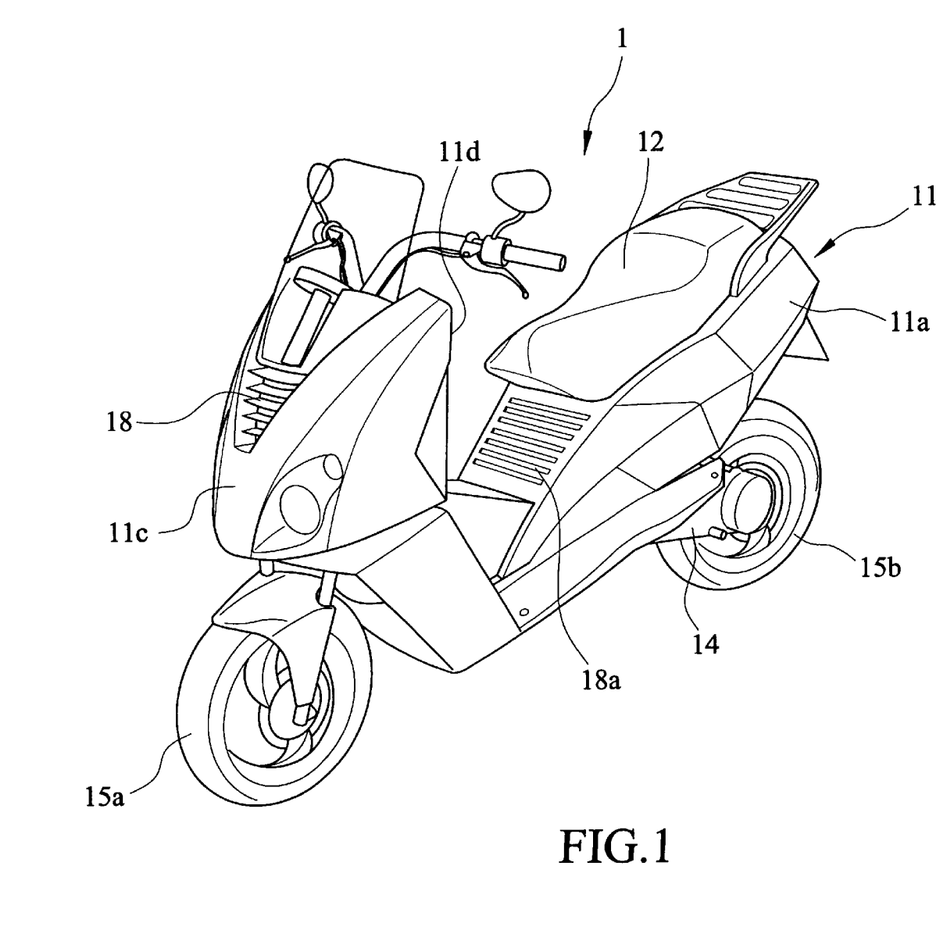
FIG. 1 is a perspective view of an electric scooter constructed in accordance with a first embodiment of the present invention.
Figure 2:
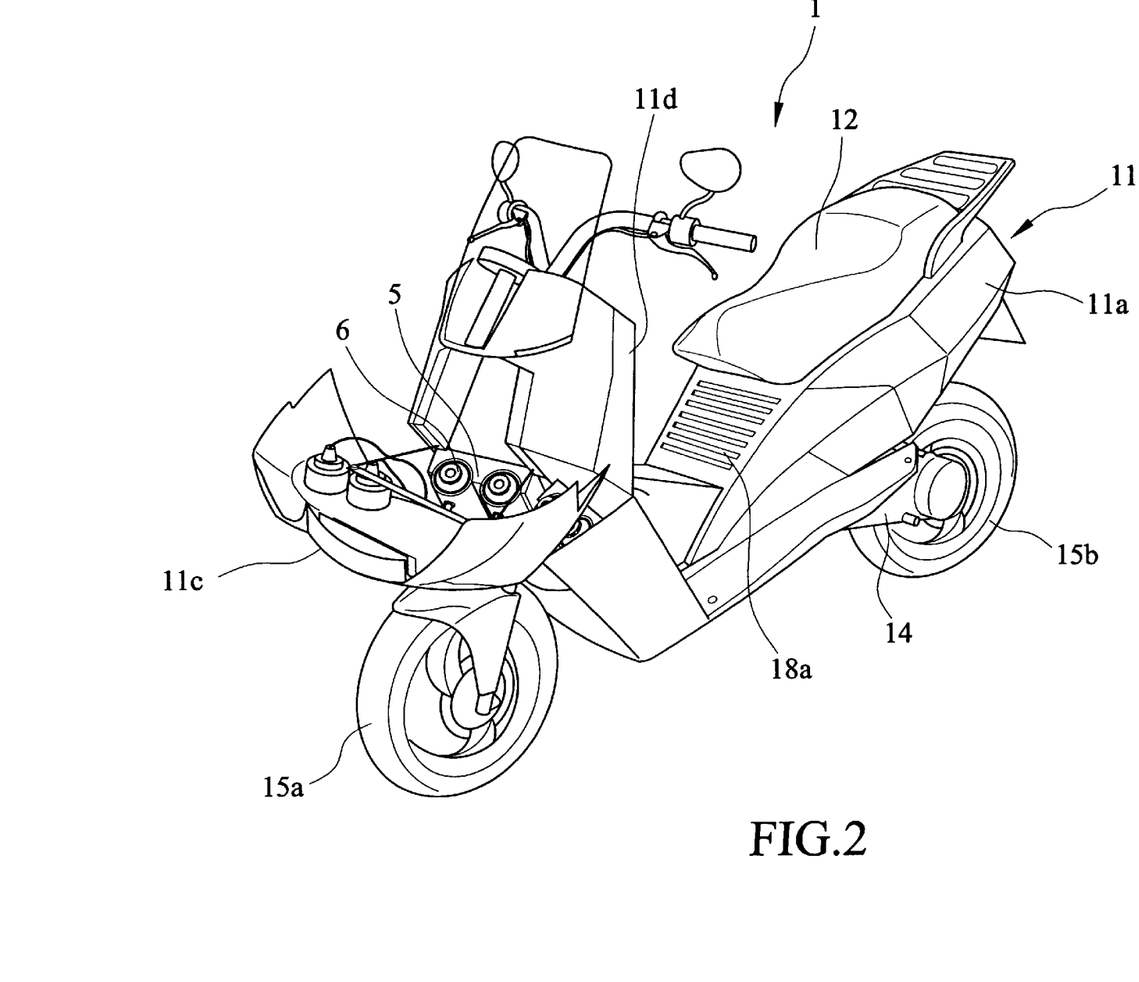
FIG. 2 is a perspective view of the electric scooter with a front cover of the electric scooter opened to show hydrogen storage canisters mounted to the scooter frame.
Figure 3:
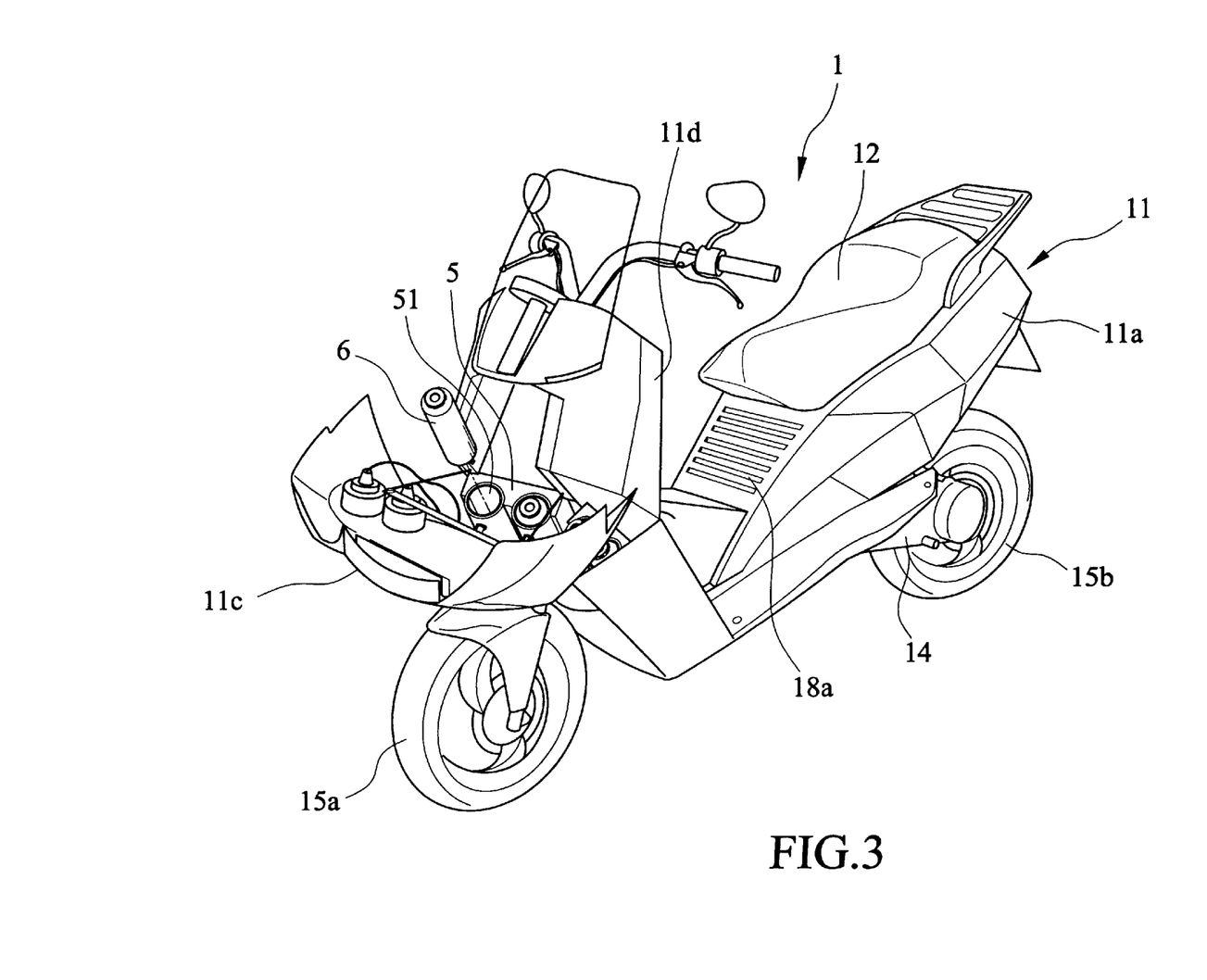
FIG. 3 is perspective view similar to FIG. 2 but showing one of the hydrogen storage canisters is removed from a canister receptacle.
Figure 4:
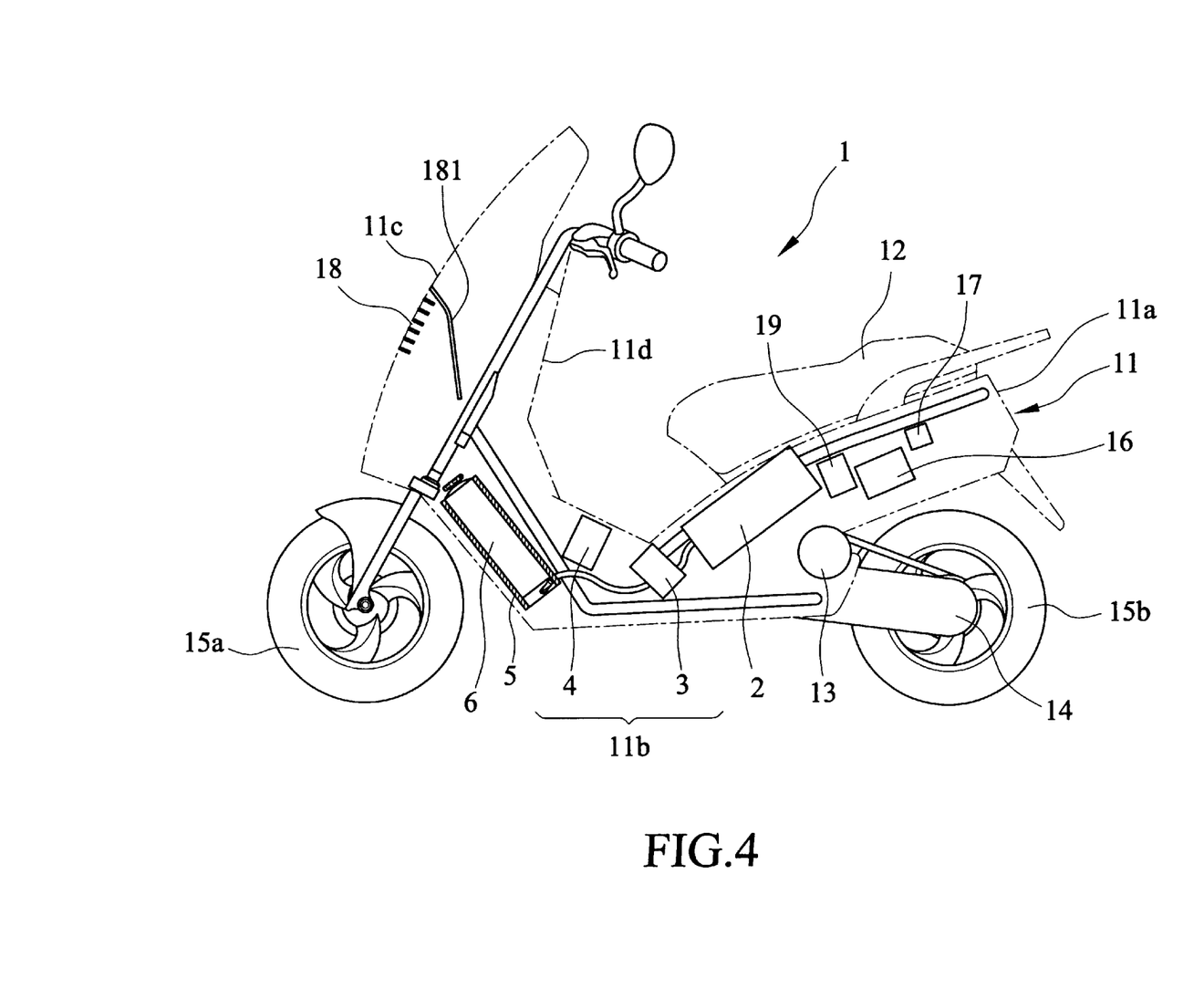
FIG. 4 is a side elevational view of the electric scooter and schematically shows an arrangement of a fuel cell based power assembly in accordance with the present invention.
Figure 5:
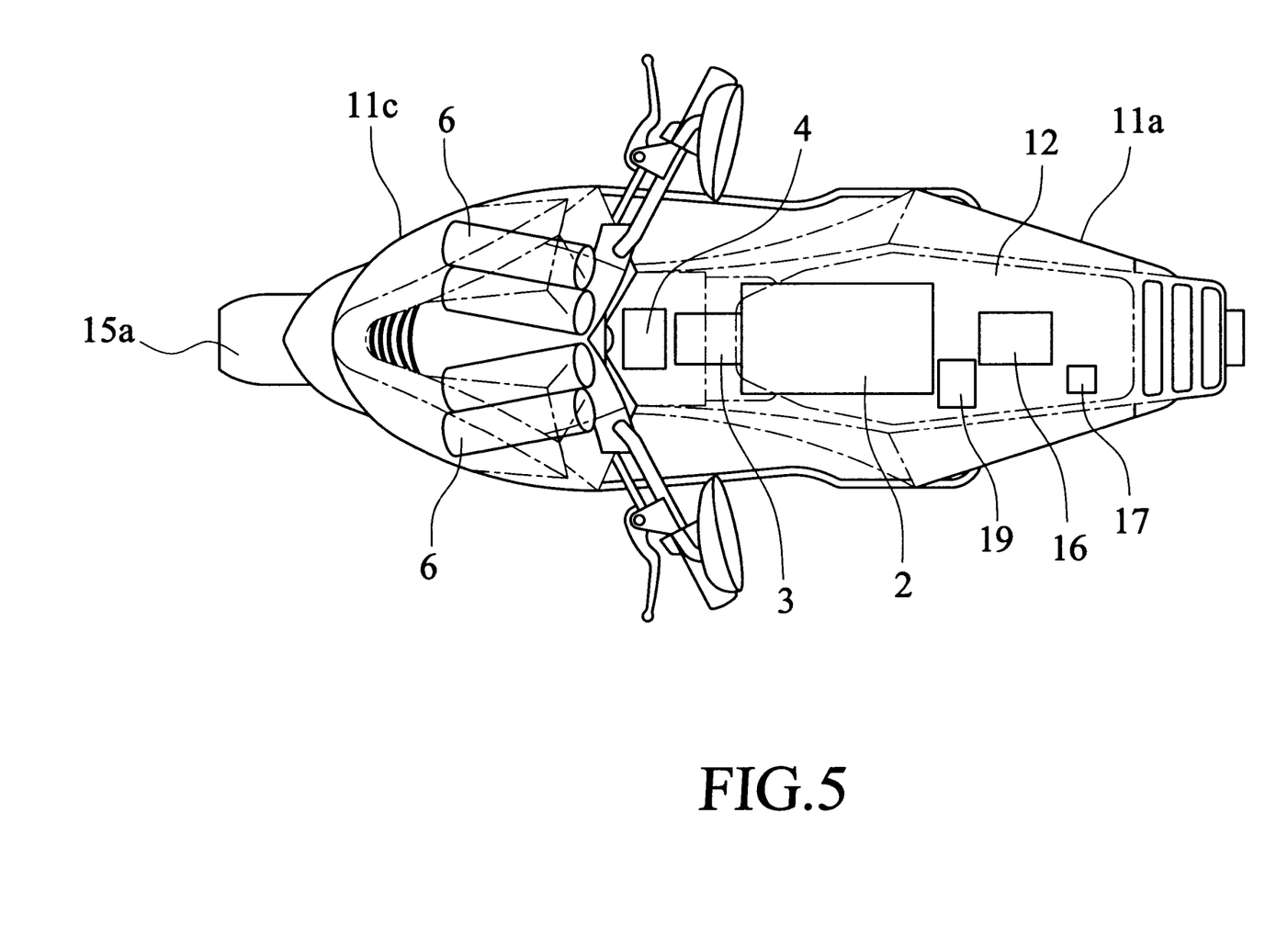
FIG. 5 is a top plan view of the electric scooter of the present invention.
Figure 6:
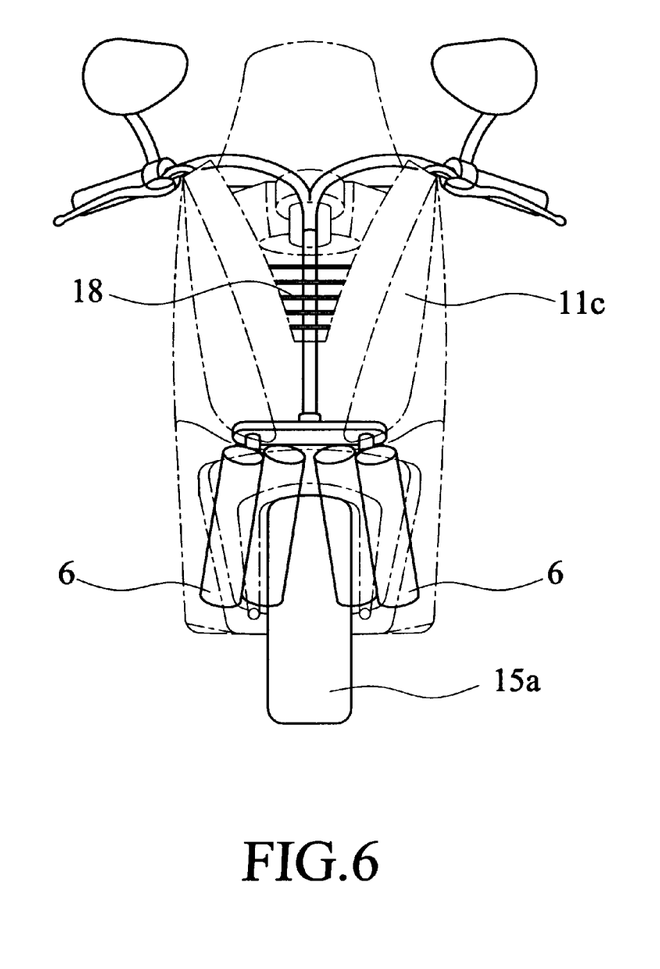
FIG. 6 is a front view of the electric scooter of the present invention.

Also referring to FIG. 5, the fuel cell engine assembly of the present invention comprises a fuel cell stack 2 mounted below the seat 12 in an inclined manner inside the rear cover 11a. The inclined arrangement of the fuel cell stack 2 is helpful in managing and draining water generated by and from the fuel cell stack 2 during the operation of the fuel cell engine assembly.

Figure 11:
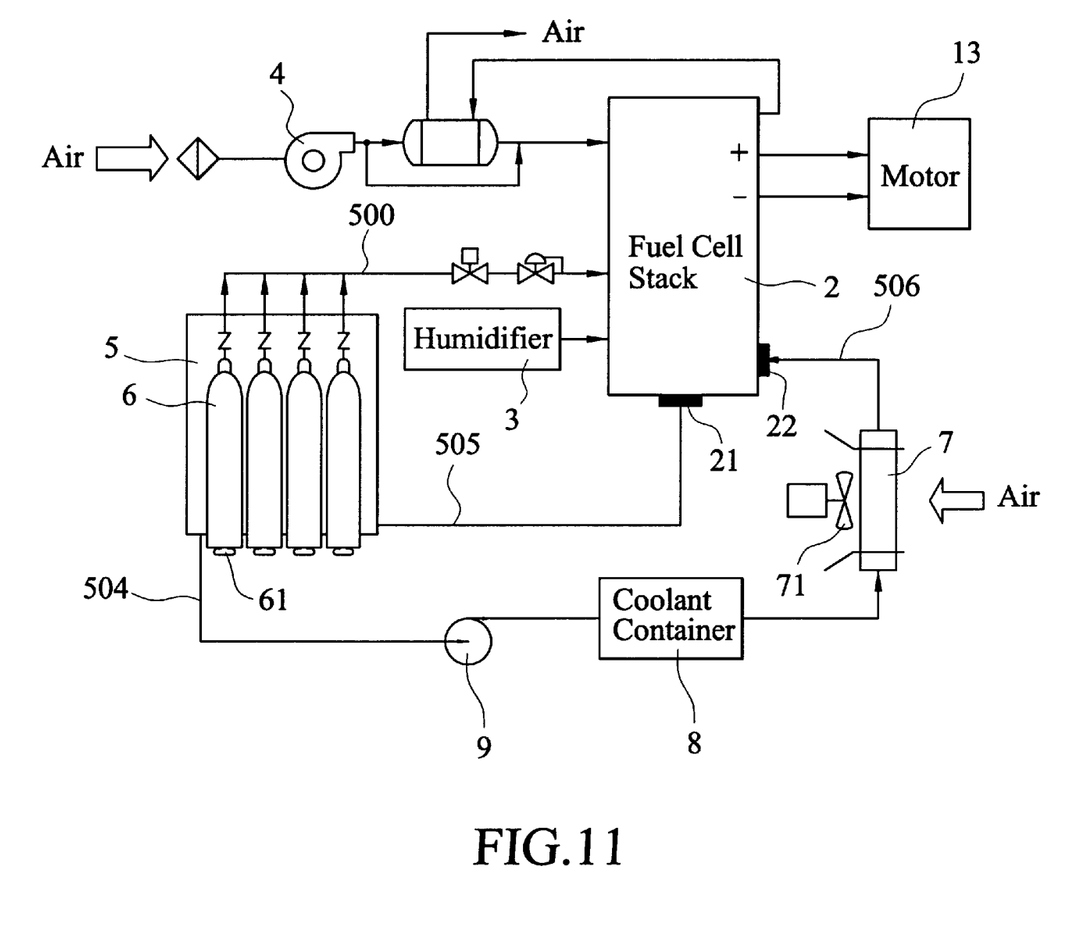
FIG. 11 is a schematic view of the fuel cell power system with piping system of the present invention.

The fuel cell stack 2 has positive and negative terminals respectively connected to an electrical motor 13 of the electric scooter 1 for powering the motor 13 to drive the scooter 1 as schematically shown in FIG. 11. The motor 13 is mechanically coupled to the rear wheel 15b by a transmission system 14 that may comprise a speed reduction device as conventionally known.

A fuel cell engine controller 16 and a motor drive controller 17 are respectively mounted inside the rear cover 11a of the scooter frame 11. The fuel cell engine controller 16 controls the operation of the fuel cell engine system, while the motor drive controller 17 controls the speed of the electric scooter 1. A storage battery 19 is also arranged inside the rear cover 11a of the scooter frame 11 for supply of power to initially activate the fuel cell stack 2.

The rear cover 11a of the scooter frame 11 extends from the bottom side of the seat 12 toward the footstep section 11b inside which a humidifier 3 is mounted. A bower 4 is arranged inside the footstep section 11b of the scooter frame 11 and located in front of the humidifier 3. The humidifier 3 maintains a humidity level for proper operation of the fuel cell stack 2. The blower 4 provides oxygen to the fuel cell stack 2 by blowing an air flow through the fuel cell stack 2. An air filter (not shown) may be selectively mounted in front of the blower 4 for removing undesired debris and contaminant particles from the air flow.

The front cover 11c is mounted to the front side of the scooter frame 11 and forms an interior space with the center cover 11d substantially above the front wheel 15a of the electric scooter 1. A hydrogen canister holder 5 provided with a number of hydrogen canister receptacles 51 is mounted in the interior space between the front cover 11c and the center cover 11d. In a preferred embodiment of the present invention, the hydrogen canister holder 5 comprises four receptacles 51 each receiving and retaining one hydrogen storage canister 6 therein. The hydrogen storage canisters 6 are evenly arranged, in a paired manner, on opposite sides of a centerline of the scooter frame 11 for balance of weight. By positioning the other components, such as the fuel cell stack 2, the humidifier 3 and the blower 4, on the centerline of the scooter frame 11, a balance of weight on opposite sides of the scooter 1 can be achieved. The components may also be adjusted in location so as to obtain the best location of the weight center of the scooter 1.

The front cover 11c is pivotally or removably mounted to the scooter frame 11 whereby the front cover 11c can be opened to expose the hydrogen canister holder 5 and the hydrogen storage canisters 6 for mounting/dismounting the hydrogen storage canisters 6 to or from the receptacles 51 of the hydrogen canister holder 5. Such a mounting/dismounting operation can be done readily without special tools and the operator does not need to take special posture.

Each receptacle 51 of the hydrogen canister holder 5 has a base member 52 (FIG. 10) on which a connector 54 is formed to connect the hydrogen storage canister 6 for discharging the hydrogen of the canister 6. The hydrogen discharged from the hydrogen storage canister 6 is conducted through hydrogen supply piping and flow control components, such as valves and pressure regulation devices, toward the fuel cell stack 2.

In accordance with the first embodiment of the present invention, the hydrogen storage canisters 6 are metal hydride hydrogen storage canisters composed of FeTi alloy for efficient storage of hydrogen. The FeTi alloy based canisters 6 have excellent capability for releasing hydrogen at room temperature. The temperature of the FeTi alloy based canisters 6 will drop if the hydrogen flow discharged therefrom increases. Thus, an air flow is introduced in the present invention to maintain the temperature of the canisters 6 in normal operation. Ventilatory openings 18 are defined in the front cover 11c for conducting air flow into the interior space between the front cover 11c and the center cover 11d. A guide plate 181 is preferably mounted inside the interior space between the front cover 11c and the center cover 11d for guiding the air from the ventilatory openings 18 toward the hydrogen storage canisters 6 so as to regulate the temperature of the hydrogen storage canisters 6. In addition, ventilatory openings 18a are also formed in the rear cover 11a at a location above the footstep section 11b for introducing an air flow to the fuel cell stack 2.

Figure 7:
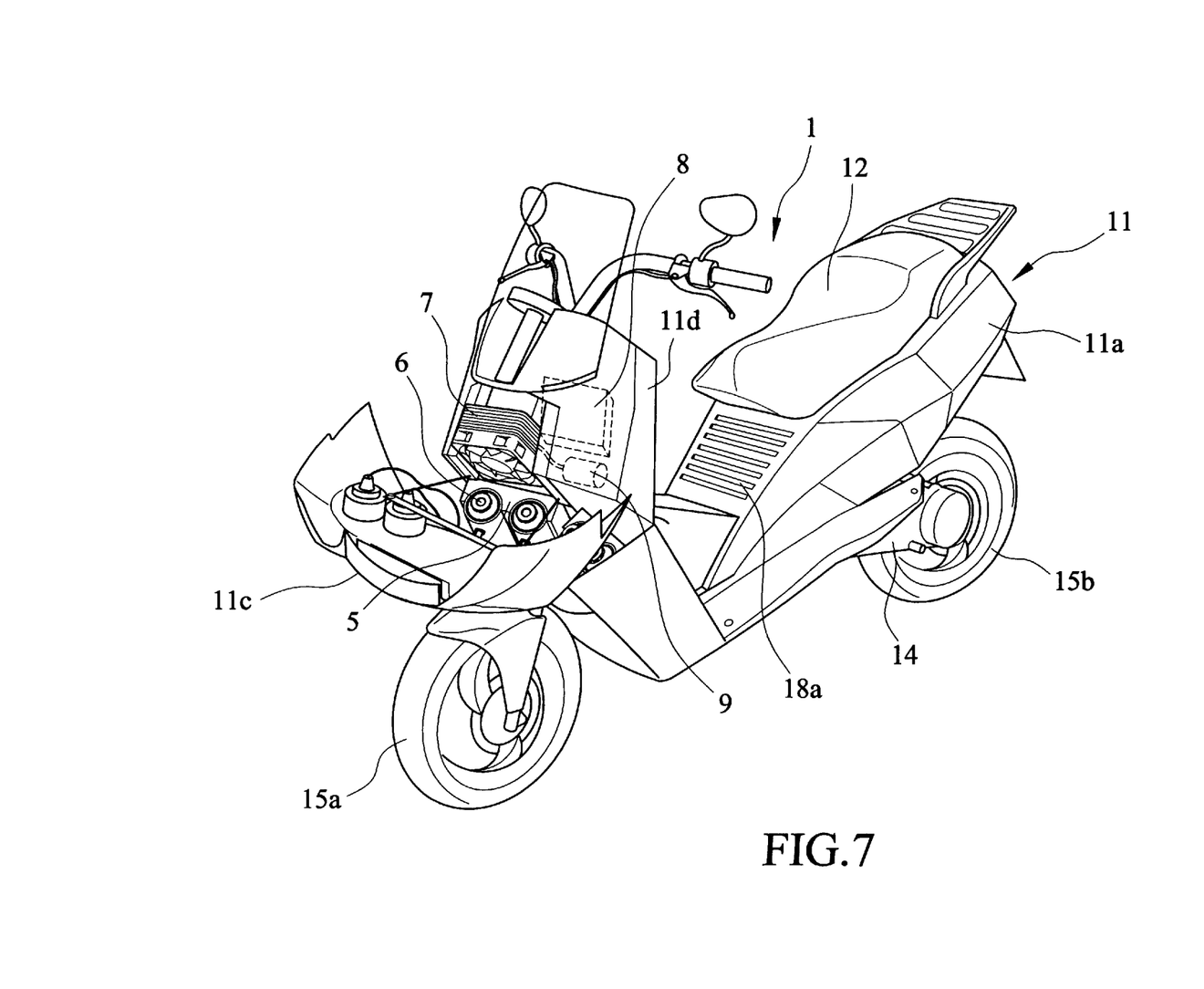
FIG. 7 is a perspective view showing an electric scooter constructed in accordance with a second embodiment of the present invention with a front cover opened to show inside details.
Figure 8:
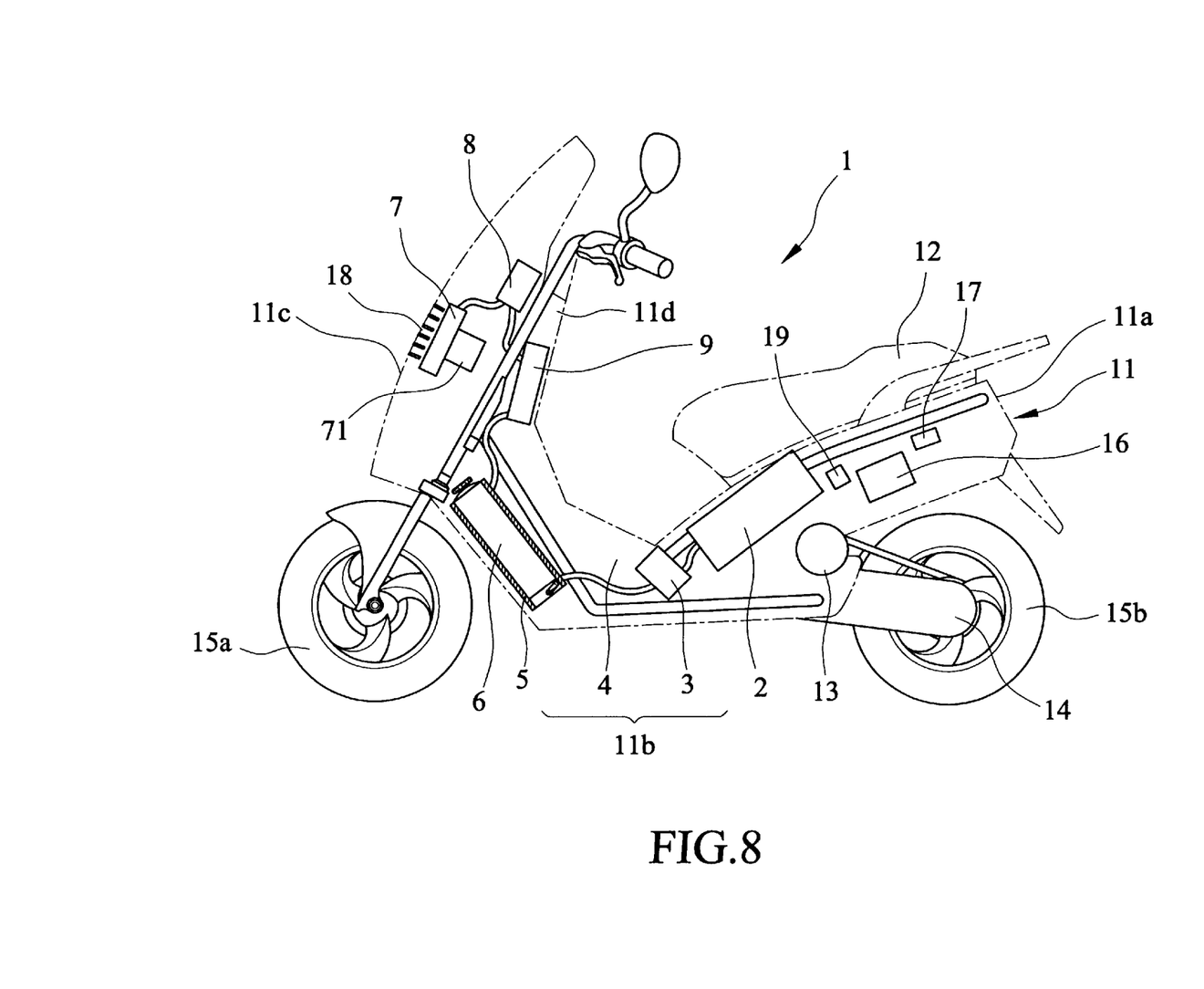
FIG. 8 is a side elevational view of the electric scooter and schematically shows an arrangement of a fuel cell based power assembly in accordance with the present invention.

FIGS. 7 and 8 show a second embodiment of the electric scooter in accordance with the present invention, which is also designated with reference numeral 1 for simplicity. The second embodiment of the electric scooter is substantially identical to the first embodiment with reference to FIGS. 1–4, except that a heat dissipation system is additionally arranged inside the interior space between the front cover 11c and the center cover 11d of the scooter frame 11. The heat dissipation system comprises a heat exchanger composed of a radiator 7 and a fan 71 causing an air flow through the radiator 7, a coolant container 8 containing a coolant therein and supplying the coolant to the radiator 7, and a pump 9 for driving a circulation of the coolant to the heat dissipation system. Piping which is not shown in the drawings connects between the radiator 7, the container 8 and the pump 9. The piping also connects to the hydrogen canister holder 5. This will be further described.

Figure 9:
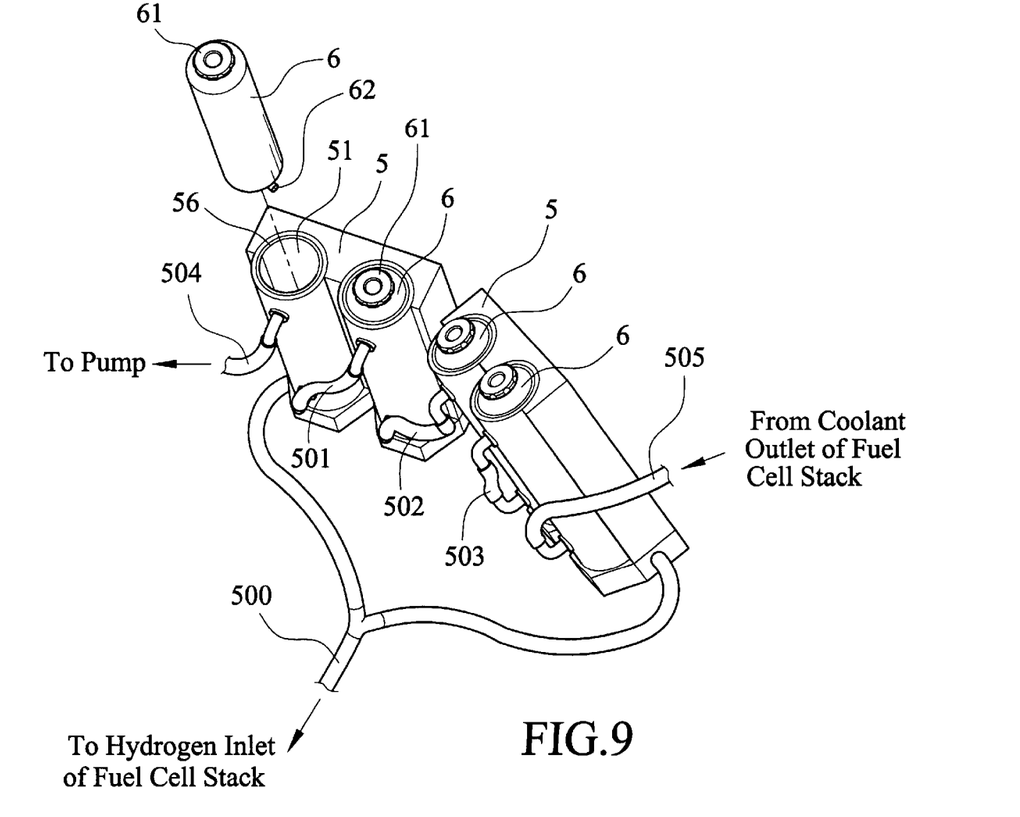
FIG. 9 is a perspective view showing a number of hydrogen storage canisters are received in the hydrogen canister holder in accordance with the present invention.
Figure 10:
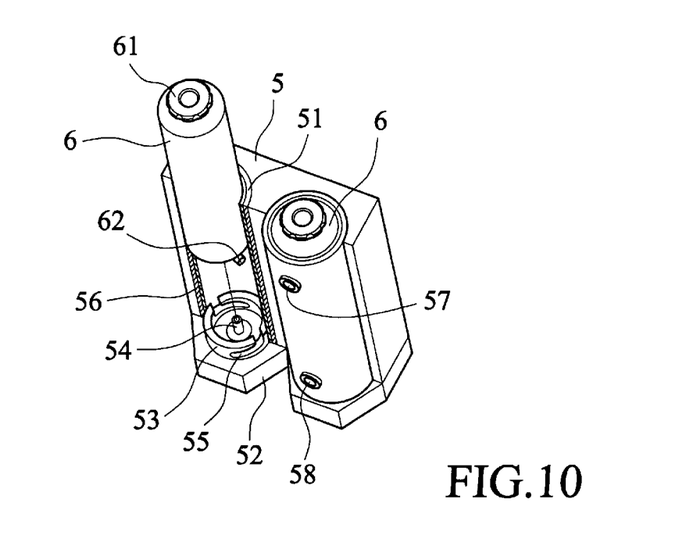
FIG. 10 is a perspective view similar to FIG. 9 with a canister receptacle partially broken to show inside details.

Also referring to FIGS. 9 to 11, the hydrogen storage canisters 6 are arranged in a weight balanced manner in the scooter frame 11. Each hydrogen storage canister 6 is deposited in each receptacle 51 of the hydrogen canister holder 5. To mount/dismount the hydrogen storage canister 6 to or from the receptacle 51, a handle 61 is formed on a top end of the hydrogen storage canister 6 for hand holding and moving the hydrogen storage canister 6.

Each canister receptacle 51 of the hydrogen canister holder 5 has a base member 52 on which a surrounding wall 53 is formed, defining a cavity (not labeled) to receive the bottom end of the hydrogen storage canister 6. The connector 54 is arranged in the cavity for releasable engagement and connection with a discharge fitting (not shown) formed on the bottom end of the hydrogen storage canister 6 for discharge of hydrogen from the hydrogen storage canister 6. The hydrogen discharged from the hydrogen storage canister 6 is conducted through a piping 500 to the hydrogen inlet of the fuel cell stack 2. A lock slot 55 is formed in the surrounding wall 53 for receiving and retaining a lock rod 62 of the hydrogen storage canister 6 in a bayonet connection manner whereby the hydrogen storage canister 6 is removably retained in the receptacle 51.

Each receptacle 51 of the hydrogen canister holder 5 comprises an inner jacket 56 which contacts with the surrounding inner surface of the receptacle 51. So, the hydrogen storage canister 6 may be tightly retained in the receptacle 51 by the inner jacket 56. In accordance with the present invention, the hydrogen canister holder 5 is arranged in such a way that the hydrogen storage canisters 6 are positioned inside the scooter frame 11 of the electric scooter 1 in an inclined manner shown in FIGS. 4 to 8. Such an inclined arrangement of the canisters 6 allows the hydrogen storage canisters 6 to be more stably retained in the hydrogen canister holder 5 and reduces the potential of unexpected disengagement between the hydrogen storage canisters 6 and the receptacles 51 caused by vibration and shake due to the operation of the electric scooter 1.

Although the hydrogen storage canisters 6 employed in the first embodiment with reference to FIGS. 1 to 5 are FeTi, alloy based hydrogen storage that is operable at room temperature, it is apparent to those having skills in the art of hydrogen storage to replace the FeTi alloy based hydrogen storage with a hydrogen storage that is operable at high temperatures. An example of the high temperature hydrogen storage and as illustrated in the second embodiment is a LaNi alloy based hydrogen storage. Thus, the hydrogen storage canisters 6 of the second embodiment are operable at a temperature above 45° C.

Each receptacle 51 of the hydrogen canister holder 5 is formed with a coolant inlet 58 and a coolant outlet 57 which are in communication with the interior space of the receptacle 51. The coolant outlet 57 of each receptacle 51 is connected by piping 501, 502, 503 to the coolant inlet 58 of the next receptacle 51 whereby the coolant is allowed to circulate through all the receptacles 51. The coolant inlet 58 of the first receptacle 51 is connected by piping 505 to a coolant outlet 21 (FIG. 11) of the fuel cell stack 2, while the coolant outlet 57 of the last receptacle 51 is connected by piping 504 to the pump 9. This allows the coolant that has a temperature rise caused by heat exchange with the fuel cell stack 2 to flow through the receptacles 51 for maintaining the hydrogen storage canisters 6 at a proper operation temperature.

FIG. 11 is a schematic view of the fuel cell power system with piping system of the present invention. The coolant at low temperature after being processed by the radiator 7 and the fan 71 is driven through piping 506 into the fuel cell stack 2 via a coolant inlet 22 of the fuel cell stack 2. A heat exchange occurs between the fuel cell stack 2 and the coolant to remove heat from the fuel cell stack 2, raising the temperature of the coolant. The high temperature coolant is discharged out of the fuel cell stack 2 via the outlet 21 of the fuel cell stack 2, flowing through the piping 505, and is conducted through the receptacles 51 of the hydrogen canister holder 5 to heat the canisters 6. The coolant, leaving the receptacles 51, is driven by the pump 9 into the coolant container 8 from which it is conducted through the radiator 7 and then back to the coolant inlet 22 of the fuel cell stack 2 again.

To this point, it is apparent that the electric scooter of the present invention has the following advantages:

(1) The electric scooter has a weight-balanced configuration with the center of gravity of the scooter substantially located at the gravity center of the scooter to provide a safe and smooth operation of the scooter.

(2) All components of the fuel cell engine assembly are firmly fixed and the center of gravity is located at a suitable altitude for stable and safe driving at high speed.

(3) The canisters are arranged in a weight balanced manner and arranged in a compact form inside the scooter frame whereby the weight balance of the scooter is enhanced and a stable riding can be achieved.

(4) The canisters can be readily mounted and replaced by simply opening the front cover of the scooter frame.

(5) The canisters are arranged in an inclined manner, which not only helps securely retaining the canisters in the scooter frame, but also allows for ready replacement of the canisters without the operator taking special posture.

(6) The fuel cell stack is substantially located at the center of gravity of the scooter and forms a balance with the canisters in a front-rear direction.

(7) The inclined arrangement of the fuel cell stack allows for efficient management and drainage of the water generated during the operation of the fuel cell stack.

(8) The heat dissipation system including a radiator and fan which are mounted inside the front cover helps to efficiently draw air to provide the maximum cooling effect.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electric scooter having an electrical motor for driving the scooter, comprising:

a scooter frame comprising a rear cover, a center cover connected to the rear cover by a footstep section, and a front cover mounted to a front side of the scooter frame and forming an interior space with the center cover;

a fuel cell stack for powering the electrical motor of the scooter, arranged in an inclined manner inside the rear cover;

a hydrogen canister holder arranged inside the interior space between the front cover and the center cover and substantially above a front wheel of the scooter, the hydrogen canister holder comprising a plurality of receptacles arranged in a weight balanced manner on opposite sides of a centerline of the scooter frame, each receptacle having a base member on which a connector is formed;

a plurality of hydrogen storage canisters containing hydrogen therein, each canister being retained in each receptacle and connected to the connector of the receptacle of the hydrogen canister holder for discharge of the hydrogen through the connector to the fuel cell stack by means of piping; and a blower arranged inside the footstep section for causing an air flow to supply oxygen to the fuel cell stack;

wherein by means of arranging the hydrogen storage canisters in a weight-balanced manner about a centerline of the scooter frame, a center of gravity of the scooter is located at a location for smooth and stable operation thereof.

2. The electric scooter as claimed in claim 1, wherein the front cover is openably mounted to the scooter frame and wherein the hydrogen storage canisters are exposed by opening the front cover with respect to the scooter frame.

3. The electric scooter as claimed in claim 1 further comprising a humidifier mounted inside the footstep section for maintaining a proper humidity level of the fuel cell stack.

4. The electric scooter as claimed in claim 1, wherein each receptacle of the hydrogen canister holder comprises a lining, the canister being received and retained in the lining.

5. The electric scooter as claimed in claim 1, wherein the front cover defines ventilatory openings for drawing air into the interior space between the front cover and the center cover, a guide plate being mounted in the interior space for guiding the air toward the hydrogen canister holder.

6. The electric scooter as claimed in claim 1, wherein the rear cover defines ventilatory openings located above the footstep section.

7. The electric scooter as claimed in claim 1, wherein the hydrogen storage canister comprises TeFi alloy based hydrogen storage.

8. The electric scooter as claimed in claim 1 further comprising a heat dissipation system comprising:

a coolant container arranged inside the interior space between the front cover and the center cover for containing a coolant;

a heat exchanger comprising a radiator and a fan arranged inside the interior space, the radiator being connected to the container by piping and also connected to the fuel cell stack whereby the coolant from the container flows through the heat exchanger to the fuel cell stack;

piping connected between the fuel cell stack and the hydrogen canister holder for conducting the coolant that flows through the fuel cell stack to the hydrogen canister holder; and a pump connected between the container and the hydrogen canister holder for circulating the coolant that flows through the hydrogen canister holder back to the container.

9. The electric scooter as claimed in claim 8, wherein each receptacle of the hydrogen canister holder comprises an inner jacket defining an interior space in the receptacle of the hydrogen canister holder, an inlet and an outlet mounted to the receptacle and in communication with the interior space defined by the inner jacket, the coolant flowing into the interior space via the inlet and discharged from the interior space through the outlet.

* * * * *